United States Patent
Hagen et al.

[15] 3,671,522

[45] June 20, 1972

[54] PRODUCTION OF 2-CARBAMYL-TETRAHYDROPYRIMIDINES

[72] Inventors: Helmut Hagen, Ludwigshafen; Friedrich Becke, Heidelberg, both of Germany

[73] Assignee: Badische Anilin- & Soda-Fabrik Aktiengesellschaft, Ludwigshafen (Rhine), Germany

[22] Filed: June 17, 1970

[21] Appl. No.: 47,149

[30] Foreign Application Priority Data

June 28, 1969 Germany.....................P 19 32 833.7

[52] U.S. Cl.................260/247.5 R, 260/256.4 H, 424/248

[51] Int. Cl. .......................................................C07d 87/40
[58] Field of Search............................260/247.5 R, 256.4 H

*Primary Examiner*—Alex Mazel
*Assistant Examiner*—Jose Tovar
*Attorney*—Johnston, Root, O'Keeffe, Keil, Thompson & Shurtleff

[57] ABSTRACT

Production of 2-carbamyltetrahydropyrimidines by reaction of haloacetamides with 1,3-alkylenediamines and elementary sulfur, and the new 2-carbamyltetrahydropyrimidines. The products are auxiliaries for the textile and leather industries, plant protection agents and starting materials for the production of textile auxiliaries, leather auxiliaries and plant protection agents.

9 Claims, No Drawings

PRODUCTION OF 2-CARBAMYLTETRAHYDROPYRIMIDINES

The invention relates to a process for the production of 2-carbamyltetrahydropyrimidines by the reaction of haloacetamides with 1,3-alkylenediamines and elementary sulfur, and to new substances of this type.

The production of 2-(N-diethylcarbamyl)-$\Delta^2$-tetrahydropyrimidine from N,N-diethyloxamic ethyl ester and trimethylenediamine in a yield of about 40 percent is described in Chem. Ber., 98, 2, 170 – 2,173 (1965).

An object of the present invention is to provide a new process for producing a large number of 2-carbamyltetrahydropyrimidines in better yields and higher purity.

Another object of this invention is the new 2-carbamyltetrahydropyrimidines.

These and other objects are achieved and 2-carbamyltetrahydropyrimidines having the general formula:

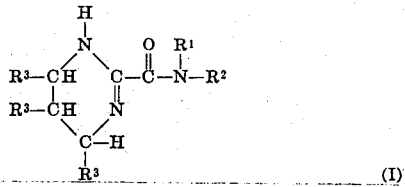

in which $R^1$ and $R^2$ may be identical or different and each denotes a hydrogen atom, an aliphatic, cycloaliphatic, araliphatic or aromatic radical, the individual radicals $R^3$ may be identical or different and each denotes a hydrogen atom or an aliphatic radical, and $R^1$ and $R^2$ together with the adjacent nitrogen atom may also be members of a heterocyclic ring are obtained advantageously by reacting a haloacetamide having the general formula:

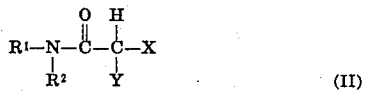

in which $R^1$ and $R^2$ have the meanings given above, X denotes a halogen atom and Y denotes a hydrogen atom or a halogen atom, with a 1,3-alkylenediamine having the general formula:

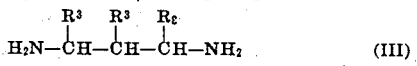

in which the radicals $R^3$ have the meanings given above, and with elementary sulfur.

The reaction (when N-n-propylchloroacetamide or N-n-propyldichloroacetamide and 1,3-propylenediamine are used) may be represented by the following equations:

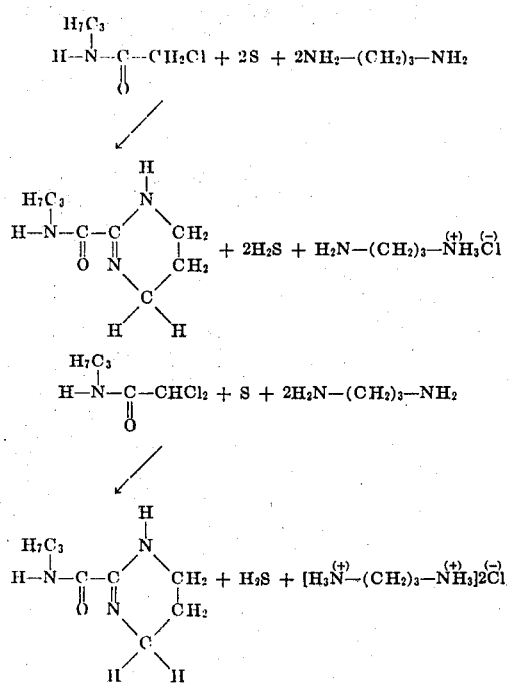

In comparison with prior art methods, the process according to the invention gives a large number of 2-carbamyltetrahydropyrimidines in better yields and higher purity.

Starting material (III) is reacted with starting material (II) and elementary sulfur as a rule in stoichiometric proportions. Starting material (III) or sulfur may however be used in excess, for example an excess of 1.5 times beyond the stoichiometric amount with reference to starting material (II). Preferred 1,3-alkylenediamines (III) and haloacetamides (II) and consequently preferred end products (I) are those in which $R^1$ and $R^2$ in the formula are identical or different and each denotes a hydrogen atom, an alkyl radical having one to twenty, particularly one to six, carbon atoms, a cycloalkyl radical having three to eight carbon atoms, an aralkyl radical having seven to 12 carbon atoms or a phenyl radical, the individual radicals $R^3$ are identical or different and each denotes a hydrogen atom or an alkyl radical having one to three carbon atoms, $R^1$ and $R^2$ together with the adjacent nitrogen atom may also be members of a five-membered or six-membered heterocyclic ring which may contain a nitrogen or oxygen atom in addition to the nitrogen atom, X denotes a chlorine atom and Y denotes a hydrogen atom or a chlorine atom. The said radicals and the heterocyclic ring may also bear as substituents groups and/or atoms which are inert under the reaction conditions, for example alkyl groups having one to four carbon atoms or chlorine on the benzene nuclei.

Examples of compounds which are suitable as starting materials (II) and (III) are as follows: monochloroacetamide, dichloroacetamide, bromoacetamide, iodoacetamide, chlorobromoacetamide; equivalent N-butyl, N-(2-methyl-5-chlorophenyl), N-n-propyl, N-isopropyl, N-(2-ethylhexyl), N-cyclohexyl, N-(2-chlorophenyl), N,N-diisobutyl, N-stearyl, N-benzyl, N-methyl-N-phenyl compounds; analogous tertiary amides with morpholine, piperidine and piperazine; 1,3-diaminopropane, 1,3-diaminobutane, 1,3-diaminohexane; 2,4diaminopentane, 1,3-diamino-2-methylpropane and 1,3-diamino-1,2,3-trimethylpropane.

The reaction is as a rule carried out at a temperature of from 50° to 180° C., preferably from 80° to 150° C., at atmospheric or superatmospheric pressure, continuously or batchwise. It is advantageous to use organic solvents which are inert under the reaction conditions, for example aromatic hydrocarbons such as benzene, toluene or xylenes; alcohols such as ethanol, propanol or butanol, cyclic ethers such as dioxane; preferably at higher reaction temperatures glycol ethers; or appropriate mixtures. A ratio of 5 to 10 moles of solvent to 1 mole of starting material (II) is preferred.

The reaction may be carried out as follows: a mixture of starting material (II) and sulfur, with or without solvent, is brought to the reaction temperature and starting material (III) is added during 1 to 3 hours. The mixture is then allowed to continue reacting for another 4 to 6 hours, until disengagement of hydrogen sulfide ceases. The end product is then separated by conventional methods, for example by filtration of the mixture, cooling and filtration of the filtrate.

Compounds which can be prepared by the process according to the invention are auxiliaries for the textile and leather industries, plant protection agents and valuable starting materials for the production of textile and leather auxiliaries and plant protection agents. For example synthetic fibrous material such as polyester or polyamide fibers can be given an antistatic finish. Moreover the substances according to the invention when used in conventional finishing methods in an amount of from 5 to 50 g/kg of fibrous material give to the finished textile material not only an antistatic effect but also a soft or firm hand according to their constitution.

The following examples illustrate the invention. The parts given in the examples are parts by weight,

EXAMPLE 1

109 parts of N-(2-methyl-5-chlorophenyl)-chloroacetamide and 32 parts of sulfur are heated to 105° C. in 800 parts of toluene in a stirred vessel and 75 parts of 1,3-diaminopropane is slowly added in the course of 2 hours. The reaction mixture is then heated under reflux until the evolution of hydrogen sulfide stops (about 5 to 6 hours). The hot toluene solution is then decanted from the diamine hydrochloride formed, filtered and cooled to about 5° to 10° C. The solid which has been precipitated in the filtrate is suction filtered and recrystallized from cyclohexane. 88 parts of 2-(N-2-methyl-5-chlorophenylcarbamyl)-Δ²-tetrahydropyrimidine is obtained having a melting point of 138° C. Another 25 parts of end product can be isolated from the concentrated toluene solution. The total yield is 90 percent of the theory.

EXAMPLE 2

67 parts of N-n-propylchloroacetamide and 32 parts of sulfur are heated to 105° C. in 800 parts of toluene in a stirred vessel. 75 parts of 1,3-diaminopropane is slowly added to the mixture in the course of 2 hours. When the development of hydrogen sulfide has ended, the mixture is worked up as described in Example 1. 67 parts of 2-(N-n-propylcarbamyl)-Δ²-tetrahydropyrimidine is obtained having a melting point of 69° C. This is equivalent to 79 percent of the theory.

EXAMPLE 3

67 parts of N-isopropylchloroacetamide is used instead of n-propylchloroacetamide in the procedure described in Example 2. 72 parts of 2-(N-isopropylcarbamyl)-Δ²-tetrahydropyrimidine is obtained having a melting point of 117° C. The yield is 85 percent of the theory.

EXAMPLE 4

75 parts of N-n-butylchloroacetamide and 32 parts of sulfur are heated at 105° to 110° C. in 800 parts of toluene in a stirred vessel. 75 parts of 1,3-diaminopropane is added to this mixture in the course of 2 hours. Working up by the method described in Example 1 gives 76 parts of 2-(N-n-butylcarbamyl-Δ²-tetrahydropyrimidine having a melting point of 64° C. This is a yield of 84 percent of the theory.

EXAMPLE 5

102 parts of N-(2-ethylhexyl)-chloroacetamide and 32 parts of sulfur are heated to 105° C. in 800 parts of toluene in a stirred vessel. 75 parts of 1,3-diaminopropane is slowly added to this mixture in the course of 2 hours. Working up by the method described in Example 1 gives 109 parts of 2-(N-2'-ethylhexylcarbamyl)-Δ²-tetrahydropyrimidine having a melting point of 35° to 36° C. This is a yield of 92 percent of the theory.

EXAMPLE 6

88 parts of N-cyclohexylchloroacetamide and 32 parts of sulfur in 800 parts of toluene as solvent are reacted in a stirred vessel as in Example 1. 82 parts of 2-(N-cyclohexylcarbamyl)-Δ²-tetrahydropyridimine is obtained having a melting point of 80° C. This is a yield of 79 percent of the theory.

EXAMPLE 7

102 parts of N-(2-chlorophenyl)-chloroacetamide and 32 parts of sulfur are heated to 105° in 800 parts of toluene in a stirred vessel. 75 parts of 1,3-diaminopropane is slowly added thereto in the course of 2 hours. After working up as described in Example 1, 97 parts of 2-(N-2-chlorophenylcarbamyl)-Δ²-tetrahydropyrimidine is obtained having a melting point of 110° C. This is a yield of 82 percent of the theory.

EXAMPLE 8

105 parts of N-cyclohexyldichloroacetamide, 16 parts of sulfur and 103 parts of 1,3-diaminopropane are heated in 600 parts of toluene for 6 hours at 110° C. in a stirred vessel. Working up by the method described in Example 1 gives 95 parts of 2-(N-cyclohexylcarbamyl)-Δ²-tetrahydropyrimidine having a melting point of 80° C. This is a yield of 91 percent of the theory.

EXAMPLE 9

183 parts of N-benzylchloroacetamide, 64 parts of sulfur and 148 parts of 1,3-diaminopropane are heated for 6 hours at 110° C. in 800 parts of toluene in a stirred vessel. Working up by the method described in Example 1 gives 173 parts of 2-(N-benzylcarbamyl)-Δ²-tetrahydropyrimidine having a melting point of 106° C. i.e. a yield of 80 percent of the theory.

We claim:
1. A process for the production of 2-carbamyl-tetrahydropyrimidines having the formula:

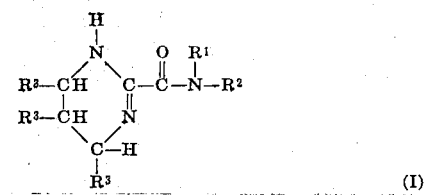

(I)

in which $R^1$ and $R^2$ are identical or different and each denotes a hydrogen atom or alkyl radical having one to 20 carbon atoms, a cycloalkyl radical having three to eight carbon atoms, an aralkyl radical having seven to twelve carbon atoms or phenyl, the individual radicals $R^3$ are identical or different and each denotes a hydrogen atom or an alkyl radical having one to three carbon atoms, or $R^1$ and $R^2$ further denote, together with the adjacent nitrogen atom, morpholino, piperidino or piperazino,
wherein
a haloacetamide having the formula:

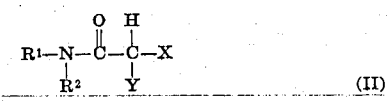

(II)

in which $R^1$ and $R^2$ have the meanings given above, X denotes a chlorine, bromine or iodine atom and Y denotes a hydrogen, chlorine, bromine or iodine atom, is reacted with an 1,3-alkylenediamine having the formula:

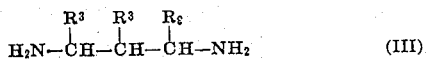

(III)

in which the radicals $R^3$ have the meanings given above and elementary sulfur.

2. A process as claimed in claim 1 wherein the reaction is carried out with starting material (III) or sulfur in up to 1.5 times the stoichiometric amount of starting material (II).

3. A process as claimed in claim 1 wherein the reaction is carried out at a temperature of from 50° to 180° C.

4. A process as claimed in claim 1 wherein the reaction is carried out at a temperature of from 80° to 150° C.

5. A process as claimed in claim 1 carried out in the presence of an organic solvent which is inert under the reaction conditions in a ratio of 5 to 10 moles of solvent for each mole of starting material (II).

6. A process as claimed in claim 1 wherein said haloacetamide is monochloroacetamide, dichloroacetamide, bromoacetamide, iodoacetamide, chlorobromoacetamide, or one of said amides bearing an N-butyl, N-(2-methyl-5-chlorophenyl), N-n-propyl, N-iso-propyl, N-(2-ethylhexyl), N-cyclohexyl, N-(2-chlorophenyl), N,N-diisobutyl, N-stearyl, N-benzyl, or N-methyl-N-phenyl group.

7. A process as claimed in claim 1 wherein said haloacetamide is a tertiary amide of morpholine, piperidine or piperazine and monochloroacetic acid, dichloroacetic acid, bromoacetic acid, iodoacetic acid, or chlorobromoacetic acid.

8. A process as claimed in claim 1 wherein said alkylenediamine is 1,3-diaminopropane, 1,3-diaminobutane, 1,3-diaminohexane, 2,4-diaminopentane, 1,3-diamino-2-methylpropane or 1,3-diamino-1,2,3-trimethylpropane.

9. A process as claimed in claim 6 wherein said alkylenediamine is 1,3-diaminopropane, 1,3-diaminobutane, 1,3-diaminohexane, 2,4-diaminopentane, 1,3-diamino-2-methyl-propane or 1,3-diamino-1,2,3-trimethylpropane.

* * * * *